(12) United States Patent
Miller (10) Patent No.: US 9,815,716 B2
(45) Date of Patent: Nov. 14, 2017

(54) METHOD FOR TREATING FRACTURE WATER FOR REMOVAL OF CONTAMINANTS AT A WELLHEAD

(71) Applicant: Lake Country Fracwater Specialists, LLC, Livonia, NY (US)

(72) Inventor: Francis C. Miller, Livonia, NY (US)

(73) Assignee: Lake Country Fracwater Specialists, LLC, Livonia, NY (US)

( * ) Notice: Subject to any disclaimer, the term of this patent is extended or adjusted under 35 U.S.C. 154(b) by 108 days.

(21) Appl. No.: 14/621,830

(22) Filed: Feb. 13, 2015

(65) Prior Publication Data

US 2015/0218020 A1 Aug. 6, 2015

Related U.S. Application Data (63) Continuation of application No. 12/914,072, filed on Oct. 28, 2010, now abandoned.
(Continued)

(51) Int. Cl.
| | | |
|---|---|---|
| *C02F 1/54* | (2006.01) | |
| *C02F 1/52* | (2006.01) | |
| C02F 1/00 | (2006.01) | |
| C02F 103/10 | (2006.01) | |
| C02F 1/28 | (2006.01) | |

(Continued)

(52) U.S. Cl.
CPC .......... *C02F 1/5236* (2013.01); *C02F 1/5281* (2013.01); *C02F 1/004* (2013.01); *C02F 1/283* (2013.01); *C02F 1/5209* (2013.01); *C02F 1/5245* (2013.01); *C02F 1/56* (2013.01); *C02F 1/66* (2013.01); *C02F 1/78* (2013.01); *C02F 5/06* (2013.01); *C02F 2103/10* (2013.01); *C02F 2201/008* (2013.01); *C02F 2301/08* (2013.01)

(58) Field of Classification Search
None
See application file for complete search history.

(56) References Cited

U.S. PATENT DOCUMENTS

| | | |
|---|---|---|
| 3,338,827 A | 8/1967 | Mausolf |
| 3,816,592 A | 6/1974 | Rinaldi |
| (Continued) | | |

FOREIGN PATENT DOCUMENTS

| | | |
|---|---|---|
| CN | 102030435 A1 | 9/2009 |
| WO | 2011026197 A1 | 3/2011 |

*Primary Examiner* — Chester Barry
(74) *Attorney, Agent, or Firm* — John M. Hammond; Patent Innovations LLC (57) ABSTRACT

A method and apparatus for removing the barium and strontium salts in water that flows back to the well head after hydrofracturing in gas well drilling. Trace levels of iron salts may also be removed from the waste frac water, followed by removal of the calcium and magnesium salts, where applicable. The barium and strontium salts are precipitated in the inert sulfate form, which renders the resulting solids mass suitable for conventional landfill or on-site disposal, and more significantly, for potential reuse and as an additive to certain well drilling processes. The calcium and magnesium salts are similarly inert and suitable for conventional disposal. The process may be managed to selectively remove barium and strontium salts to desired levels, depending upon the intended reuse or disposition. The apparatus may be provided in a highly compact portable configuration that is transportable by a highway vehicle.

17 Claims, 9 Drawing Sheets

Related U.S. Application Data

(60) Provisional application No. 61/255,504, filed on Oct. 28, 2009.

(51) Int. Cl.
    *C02F 1/56*     (2006.01)
    *C02F 1/66*     (2006.01)
    *C02F 1/78*     (2006.01)
    *C02F 5/06*     (2006.01)

(56) References Cited

U.S. PATENT DOCUMENTS

| | | | |
|---|---|---|---|
| 4,491,523 A | 1/1985 | Foreman | |
| 4,724,084 A | 2/1988 | Pahmeier et al. | |
| 5,158,688 A | 10/1992 | Craven et al. | |
| 5,198,156 A | 3/1993 | Middleton et al. | |
| 5,312,551 A | 5/1994 | Perron et al. | |
| 6,572,771 B2 | 6/2003 | Yamasaki et al. | |
| 7,608,190 B1 | 10/2009 | Banerjee et al. | |
| 7,963,338 B1 | 6/2011 | Bader | |
| 8,834,726 B2 * | 9/2014 | Keister | E21B 21/068 166/308.1 |
| 8,877,690 B2 * | 11/2014 | Keister | C01D 3/06 210/638 |
| 9,580,343 B2 * | 2/2017 | Keister | C01D 3/06 |
| 2001/0054586 A1 | 12/2001 | Christiansen et al. | |
| 2008/0135478 A1 | 6/2008 | Zuback et al. | |
| 2010/0125044 A1 | 5/2010 | Keister | |
| 2011/0042320 A1 | 2/2011 | Allen | |
| 2015/0060368 A1 * | 3/2015 | Keister | C01D 3/06 210/710 |

\* cited by examiner

METHOD FOR TREATING FRACTURE WATER FOR REMOVAL OF CONTAMINANTS AT A WELLHEAD

CROSS-REFERENCE TO RELATED PATENT APPLICATION

This application is a continuation of copending U.S. patent application Ser. No. 12/914,072, filed on Oct. 28, 2010, which claims priority from U.S. provisional patent Application No. 61/255,504 filed Oct. 28, 2009, the disclosures of which are incorporated herein by reference.

BACKGROUND

Field of the Invention

This invention relates to the removal of contaminants from water discharged at a gas wellhead, and more particularly to the removal of contaminants from fracture water that is used to initially used to fracture deep subterranean rock formations near a well bore, and that is subsequently discharged from the wellhead.

Description of Related Art

Certain subterranean geologic formations contain significant reservoirs of natural gas. For example, the Marcellus Shale subterranean formation, which extends from central and western New York southwardly through Pennsylvania, West Virginia, and eastern Ohio, contains significant natural gas deposits. Extraction of this gas has been made economically and technically feasible by the utilization of a technology referred to as "hydrofracing." This technology utilizes injection of large volumes of water at high pressure to fracture the subterranean shale structures, which causes them to separate and release the pockets of methane gas contained within the shale strata.

This injected water returns initially to the surface as initial "flowback water" and over the life of the well as "production water." The return water contains contaminants from the subterranean structures, as well as from pretreatment of the water with certain chemicals prior to performing the hydrofracing injection. As much as one million gallons or more of flowback water may be generated within the first weeks following a typical fracturing injection, and an additional two million to three million gallons of production water may be produced from the well over the life of the well's methane production cycle of multiple years.

The contaminants in this water render it unsuitable for reuse except in small proportions. Disposal of the water has become an expensive proposition for the well developers and also a difficult environmental problem. New environmental regulations, as well those proposed and likely to be implemented, will essentially eliminate the ability to dispose of or treat this water by conventional means within the states of Pennsylvania and New York. There is a significant need by the well developers for technologies which will treat the water to enable its reuse to a maximum extent.

The contaminants in the water include many of the following components.

Sodium Chloride
Barium Salts—typically in the chloride form
Strontium Salts—typically in the chloride form
Calcium and Magnesium (Hardness) Salts—typically in the bicarbonate and/or chloride form
Volatile Organic Compounds (VOC) resulting from the degradation of the agent sea creatures captured within the shale formation
Residual Organic Compounds (ROC) from the water treatment chemicals introduced into the fracing water to enhance the hydrofracing process
Iron Salts—in multiple species The sodium chloride is not considered a significant problem relative to the reuse of the water up to some practical limit that is determined by the hydrofracing operator. The barium and strontium salts form insoluble solids during the fracing process which have been determined to be degradative to the mining equipment due to abrasion when the water is reused and the concentrations of these materials exceed 100 ppm. The calcium salts form hardness scale in the subterranean shale structures and are similarly limited in concentration but at much higher levels. Both of these conditions may result in the obstruction of portions of the fissures within the shale strata created by the fracing process when the water is reused, and the concentrations of these salts are excessive. The presence of the residual or incipient volatile organic chemicals in the return water results in further difficulties in proper reformulation of it as fracing water for reuse.

The chemistry of the removal of the barium and strontium salts and the calcium salts is well defined in various documentation and literature. The solidification of all of the salts may be accomplished by conventional evaporation technology. However, the contamination of the solid sodium chloride salt by the calcium, and in particular the barium and strontium, make its disposal difficult and its beneficial reuse not feasible. The current method of return water remediation is to transfer it upon its discharge from the wellhead into tanker trucks, and then haul it substantial distances to off-site water treatment plants. This is expensive, and additionally, it will be prohibited or severely limited in many jurisdictions (particularly New York and Pennsylvania) by new environmental regulations taking effect in early 2011. Semi-portable processing systems are also in use on a limited basis in operations in this formation. However, recently promulgated regulations now limit the space available at well site operations and remote treatment operations. This severely limits the ability to treat the flowback water at a well site. Furthermore, the well site conditions require rapid treatment of the flowback water. Conventional systems which may be portable (or semi-portable) require a considerable footprint in order to meet the flow requirements.

In addition, the flowback water from the hydrofracturing of certain sections of the Marcellus Shale formation contains levels of barium and strontium contamination significantly higher than previously encountered in other formations. To the best of the Applicant's knowledge, treatment of these elevated levels of barium and strontium in a cost effective and portable format has not yet been achievable.

What is needed is a modular, portable and cost effective method and apparatus for treating the frac water for the removal of the barium, calcium and strontium salts onsite at the wellhead.

SUMMARY

The Applicant has developed a method and apparatus to meet this need. The method and apparatus preferentially and sequentially remove the barium and strontium salts, along with trace levels of iron salts from the waste frac water, followed by removal of the calcium and magnesium salts, where applicable. The barium and strontium salts are precipitated in the inert sulfate form, which renders the resulting solids mass suitable for conventional landfill or on site disposal, and more significantly, for potential reuse and as an additive to certain well drilling processes. The calcium and magnesium salts are similarly inert and suitable for conventional disposal means. The process may be managed to selectively remove barium and strontium salts to desired levels, depending upon the intended reuse or disposition. The process may also operate with or without the hardness salt removal. It has been observed that the Applicant's process also reduces or removes trace levels of other problematic metals, such as iron and manganese. The product water from the instant process is a sodium chloride solution, which, with separate ozone treatment and carbon filtration where required, may be suitable as a feedstock to an evaporation process for the production of sodium chloride salt crystals for industrial and potentially commercial uses. The instant process may optionally include ozone treatment and carbon filtration processes for removal of organic contamination.

The process requires a small footprint, compared to known treatment systems, is fully portable, and has the capability to treat elevated levels of barium and strontium in its portable format at sufficiently high flow rates to meet the reported industry on-site needs. In addition, the modular format of the equipment provides for meeting elevated flow rate requirements with additional duplicate portable systems.

More specifically, in accordance with the present invention, there is provided a method of treating contaminated water effluent from a gas well. The method comprises adding inorganic sulfate to a volume of the contaminated water to cause precipitation of at least about 95 percent of barium and strontium present in the contaminated water as barium sulfate and strontium sulfate; adding a first reagent to the volume of the contaminated water to cause the formation of barium sulfate and strontium sulfate flocs of a first size; adding a second reagent to the volume of the contaminated water to cause growth of the barium sulfate and strontium sulfate flocs of the first size into separable barium sulfate and strontium sulfate flocs; and separating the separable barium sulfate and strontium sulfate flocs within a filtration system into solid barium sulfate and strontium sulfate and a first filtrate. The method may further comprise adding a third reagent to the first filtrate to cause the precipitation of hardness salts, and separating the hardness salts within the filtration system into hardness salts solids and a second filtrate. The method may be performed using a portable vehicle suitable for highway use, which carries the filtration system, and vessels for containing the inorganic sulfate, the volume of contaminated water, and the reagents.

In some circumstances, the concentrations of barium and strontium chloride in the contaminated water may be sufficiently high such that the excess sulfate required to deplete those contaminants to acceptable levels may result in sulfate salt levels in the filtrate that are sufficiently high so as to render such filtrate unusable for reuse or discharge to the environment. In these circumstances, the Applicant has discovered that a method comprising a two-stage precipitation is beneficial. The method is comprised of adding inorganic sulfate to a volume of the contaminated water to cause precipitation of a first precipitate comprised of all but about 100 parts per million or less of barium present in the contaminated water as barium sulfate precipitate, and up to about 10 percent of strontium present in the contaminated water as strontium sulfate precipitate; separating the first precipitate from the volume of the contaminated water within a filtration system into first precipitate solids and a first filtrate; adding inorganic sulfate to the first filtrate to cause precipitation of a second precipitate comprised of all but about 1000 parts per million of the remaining strontium present in the contaminated water as strontium sulfate precipitate; and separating the second precipitate from the first filtrate within a filtration system into second precipitate solids and a second filtrate. The method may further comprise producing the second filtrate at a concentration of dissolved inorganic sulfate of less than about 1000 parts per million. The method may further comprise adding a reagent to the second filtrate to cause the precipitation of hardness salts, which typically are calcium and magnesium plus strontium hydroxide and or carbonate; and separating the hardness salts within the filtration system into hardness salts solids and a third filtrate. This third filtrate is then suitable for reuse as a portion of the make up water for hydraulic fracturing.

In accordance with the present invention, there is also provided an apparatus for treating contaminated water effluent from a gas well comprising a first vessel supported by a first stand disposed upon a support bed; a second vessel supported by a second stand disposed upon the support bed and in liquid communication with the first vessel through a first conduit configured to provide gravity feed of liquid from the first vessel to the second vessel; and a third vessel disposed upon the support bed and in liquid communication with the second vessel through a second conduit configured to provide gravity feed of liquid from the second vessel to the third vessel. The first conduit is configured to provide laminar flow of liquid from the first vessel to the second vessel, and the second conduit is configured to provide laminar flow of liquid from the second vessel to the third vessel.

The first conduit may be comprised of a manifold of feed pipes connected to a side wall of the first vessel. The side wall of the first vessel is cylindrical in shape, and the manifold is comprised of feed pipes directed radially outwardly from the wall and connected to a header. The first conduit may be minimally sloped from the first vessel to the second vessel so as to result in open channel laminar flow of liquid from the first vessel to the second vessel. In like manner, the second conduit may be minimally sloped from the second vessel to the third vessel so as to result in open channel laminar flow of liquid from the second vessel to the third vessel.

The apparatus may include a fourth vessel supported by the second stand and in liquid communication with the first vessel through the first conduit, wherein the first conduit is comprised of a U-shaped section configured to provide equally distributed laminar flow of liquid through a junction to the second vessel and the fourth vessel.

The support bed may be disposed upon a transport vehicle, such as a trailer or a truck, thereby rendering the apparatus portable and easily moved from well drilling site to site.

BRIEF DESCRIPTION OF THE DRAWINGS

The present disclosure will be provided with reference to the following drawings, in which like numerals refer to like elements, and in which.

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by the appended claims.

DETAILED DESCRIPTION

For a general understanding of the present invention, reference is made to the drawings. In the drawings, like reference numerals have been used throughout to designate identical elements.

Referring to FIGS. 1-4, the process 200 for treatment of frac water is comprised of the sequential addition and timed reaction of chemicals for the precipitation of the inorganic contaminants, and their subsequent coagulation and flocculation and filtration. The frac water, also referred to herein as return water, is water which returns back up to the well head after the hydrofracturing injection process is performed. This water contains dissolved inorganic salts, dissolved and/or emulsified organic compounds, and may also contain some fine particulate solids. As used herein, "frac water" may be either or both "flowback water", which is generated within the first weeks following a typical fracturing injection before gas production from the well is started, or production water, which is generated over the life of the well production cycle.

Figure 1:
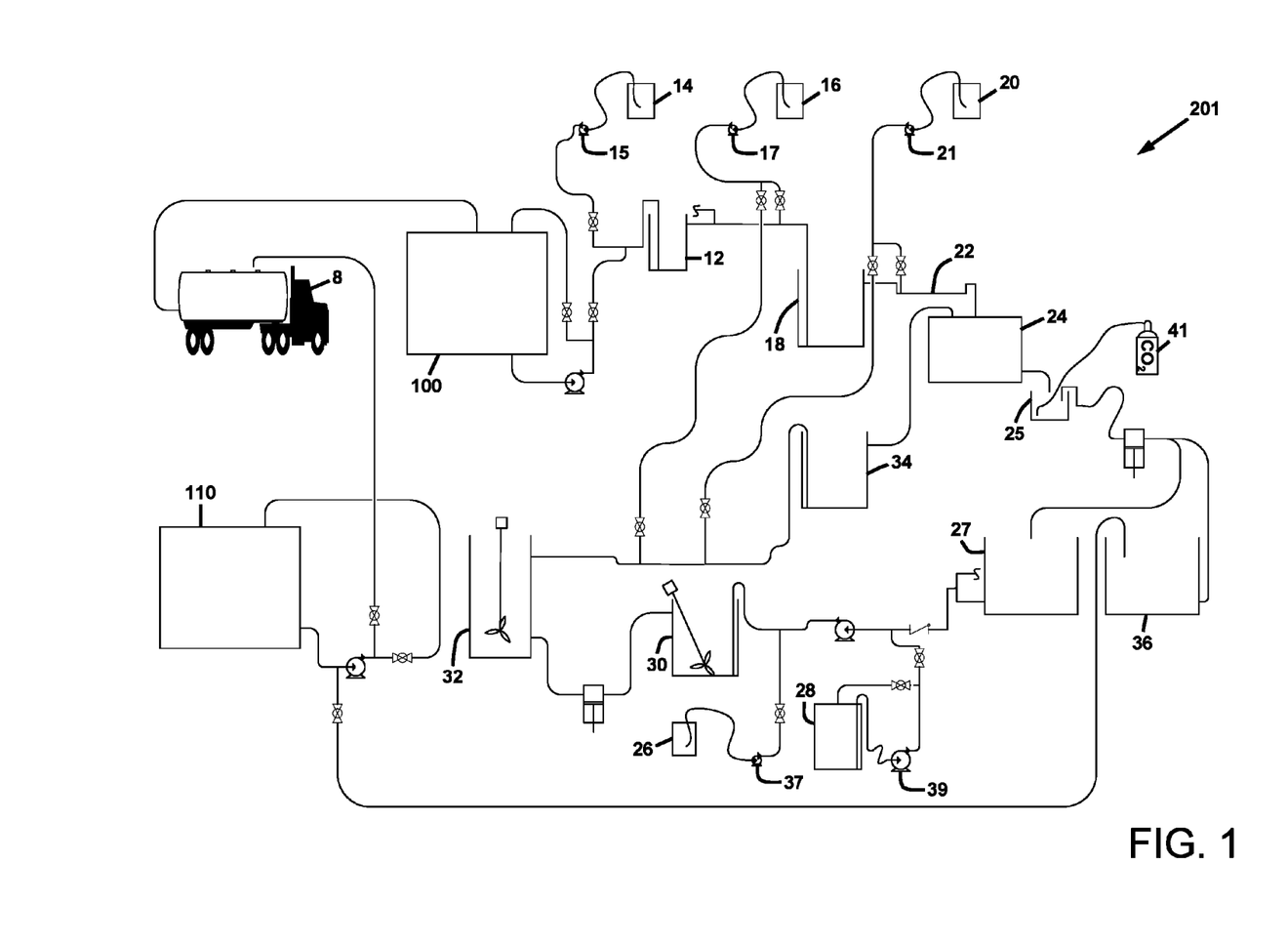
FIG. 1 is a schematic diagram of the instant process and apparatus for treating frac water.

The frac water that is discharged from the wellhead (not shown) may be captured and directed into a tanker truck 8, which transports the frac water to a storage tank 100 or alternatively a lagoon 100, and transfers the frac water thereto. Alternatively, the frac water may captured and pumped directly into the storage tank 100 if the frac water treatment apparatus is located near the wellhead. The apparatus 201 that performs the process 200 may also be connected to the outlet of an ozonation treatment system (not shown), wherein the storage tank, or lagoon, 100 may be between the ozonation system and the apparatus 201 of the present invention.

The apparatus 201 is comprised of a portable vehicle 10, such as a trailer or truck, which carries various tanks, pumps, filtration device(s) and other equipment for performing the precipitation, coagulation, flocculation and filtration operations on the frac water. In step 210, a portion of frac water is delivered into a tank or tanks 12 for treatment. In step 220, the barium and strontium salts that are in solution in the frac water are precipitated together through an ion exchange reaction with an inorganic sulfate salt such as magnesium sulfate or sodium sulfate, or possibly sulfuric acid. The inorganic sulfate salt is introduced from a tank or tanks 14 via pump 15 to the waste frac water in tanks 12 as a dissolved aqueous solution of a concentration below its saturation point. It may be blended and reacted with the waste frac water in either batch or continuous tank or tanks 12. Alternatively, the inorganic sulfate salt solution may be blended as a continuous feed into a moving flow of the waste frac water in a pipe or other conduit.

It has been determined that in one embodiment, an optimum reaction time to complete the ion exchange reaction is approximately two to three minutes. Depending upon the degree of desired removal of the barium and strontium by the well operator, the molar ratio of inorganic sulfate salt to barium and strontium salts has been found to be effective in the range of 0.5 moles of inorganic sulfate salt to barium and strontium salts for partial removal, up to in excess of 3 moles of inorganic sulfate salt to barium and strontium salts for complete removal, under conditions in which the presence of excess sulfate is not detrimental to the downstream utilization of the treated water. An alternative method of treatment in which mitigation of the production of excess sulfate is provided is described subsequently in this specification, with reference to FIGS. 6-8.

Referring again to FIGS. 1-4, following the ion exchange reaction, in step 230, a coagulant is introduced into the slurry of the precipitated barium and strontium sulfate, and other precipitated materials. This first reagent/coagulant forms a fine "pin floc" of the precipitated materials which will later be formed into a larger floc suitable for efficient filtration. The optimum coagulant for this application has been determined to be a metal chloride, aluminum chlorhydrate. However multiple alternate metal chlorides may also be utilized. The addition ratio of the coagulant has been determined to be approximately 0.1 to 0.8 parts of the coagulant per part of the solution. This ratio is dependent upon the concentrations of the barium and strontium contamination in the influent water, which in turn produces a resultant quantity of precipitated solids in the solution. The coagulant may introduced to the precipitated slurry as a neat (liquid) material or as a diluted aqueous solution provided from a vessel 16, depending upon the site specific requirements and available feed equipment, such as pump 17. It may be blended and reacted with the slurry in either a batch or continuous flow-through tank 18, or as a continuous feed into a moving flow of the precipitated slurry in a pipe or other conduit. In one embodiment, it has been determined that an optimum reaction time to complete the pin floc formation is approximately three to ten minutes. In one embodiment, it has been determined that the process performance is optimized by the utilization of a low speed wide blade turbine style agitator such as a Rushton Impeller. It has been further determined that a particular range of tip velocity of the turbine blades is beneficial to the formation of an optimum pin floc for optimum floc formation required for satisfactory hydraulic transport and subsequent filtration and clarification of the flowback water for reuse. The preferred tip velocity is in the range of 22 to 44 feet per second.

Following the formation of the pin flocs by the introduction of coagulant in step 230, an anionic flocculant is added to the slurry in step 240. This second reagent/flocculant forms the pin flocs into large flocs which are suitable for efficient filtration. In one embodiment, the optimum flocculant for this application has been determined to be anionic polyacrylimide F-303AH as provided by Water Specialists Technologies, LLC of Sanford, Fla. However multiple alternate anionic poly acrylimides may also be utilized. The addition ratio of the flocculant has been determined to be approximately 0.01 to 0.1 parts of the flocculent per part of the solution. As in the case of the coagulant addition, this ratio is dependent upon the concentrations of the barium and strontium contamination in the influent water, which in turn produces a resultant quantity of precipitated solids in the solution. The flocculant may be provided from a vessel 20 via gravity feed or pump 21 to the pin floc slurry as a diluted aqueous solution in the range of 0.1% to 0.5% concentration, depending upon the site specific requirements and available feed equipment. It may be blended and reacted with the pin floc slurry into a downstream continuous flocculation tank 29 (FIGS. 9A/9B), or as a continuous feed into a moving flow of the pin floc slurry in a pipe or other conduit 22. In one embodiment, it has been determined that an optimum reaction time to complete the large floc formation is approximately 5 minutes. It has further been determined that the process performance is optimized by the utilization of a low speed wide, reversed curve, blade turbine style agitator such as a Rushton Impeller with such reversed curve blades in the flocculation tank.

It has been further determined that a particular range of tip velocity of the turbine blades is beneficial to the formation of an optimum floc for optimum hydraulic transport and subsequent filtration and clarification of the flowback water for reuse. The preferred tip velocity is in the range of 21 to 31 feet per second.

In step 250, the now flocculated slurry is introduced into a filtration device 24. The filtration device 24 may be an active filter, wherein solids are captured on a filter medium, and then dewatered by the action of inflatable bladders disposed against the medium. One suitable filtration device 24 is the "DryBox" filtration system manufactured and sold commercially by Innovative environmental Products, Inc. of Livonia, N.Y. under license from Idee e Prodotti S.r.l. of Cavenago Brianza, Italy. This filter is provided in a multiple solid holding capacities ranging from 5 cubic feet up to 40 cubic yards.

In one embodiment, the DryBox or other filter 24 may be a small unit provided on the vehicle 10, such as a Mini DryBox. The Mini DryBox 24 may be emptied by removal of a filter basket from the top of the unit. An active filtration system, which is installed on top of the basket and is comprised of air tubes (referred to herein as inflatable bladders) is linked to an electric control panel for ON-OFF actuation (i.e. inflation and deflation) via a pneumatic system. The bladders intermittently inflate against the filter medium and wet solid cake contained therein, thereby establishing flow channels within the dewatering sludge cake, and allowing the drainage of the liquid filtrate from the solid cake, as disclosed in U.S. Pat. No. 5,614,092 of DiLeo, the disclosure of which is incorporated herein by reference.

In another embodiment (not shown), the DryBox may be a large filter unit which may be configured as a separate roll-off style refuse box not carried on the vehicle 10. The DryBox may include an internal basket made of AISI 304 stainless steel, galvanized steel, or epoxy coated carbon steel. The basket supports the filter bag and an "active filtration system." Dewatered solids collected within the filter bag are discharged from the rear of the DryBox in a conventional refuse box disposal method by opening a rear door and elevating the end of the box to empty the contents.

An open box-shaped housing contains the filtering structure and collects the processed liquid, which is then discharged outside through a pipe connection. The filter bag (also referred to herein as a filter medium) can be replaced at the end of each use by an operator.

Instead of filtration and dewatering, at locations where this practice may be permissible, the flocculate slurry may be discharged to the well drilling residual waste collection pit, or other such proximate collection pit or lagoon, where the flocculated slurry may settle and the clarified supernatant liquid may be withdrawn from the pit or lagoon for the same intended uses.

As alternatives to the DryBox filter and other active filters, various other static style gravity filtration systems available to the industry may be used as the filtration device 24. These include common filtration boxes as provided by Rain for Rent (25 Yard Filter Box) or Flotrend (models RB-25-O-G/V-VPF, RB-20-O-G/V, RB-20-C-B and/or RB-25-O-G/V-S) and other similar agents and various applications of the Geotube® as provided by Marifi Company. These systems perform substantially the same function as the DryBox type filter. However, the "active filtration" process of the DryBox is believed to provide enhanced and accelerated dewatering of the filtered solids and is significantly less sensitive to problems associated with upsets in the coagulant and flocculant feed systems. Alternatively, the Squeeze Tower Press (Squeeze Box™) and/or the Phaze Box™ filters, manufactured and sold commercially by Idee e Prodotti S.r.l. of Cavenago Brianza, Italy, are also "active filtration" devices, and may be suitable.

Figure 6:
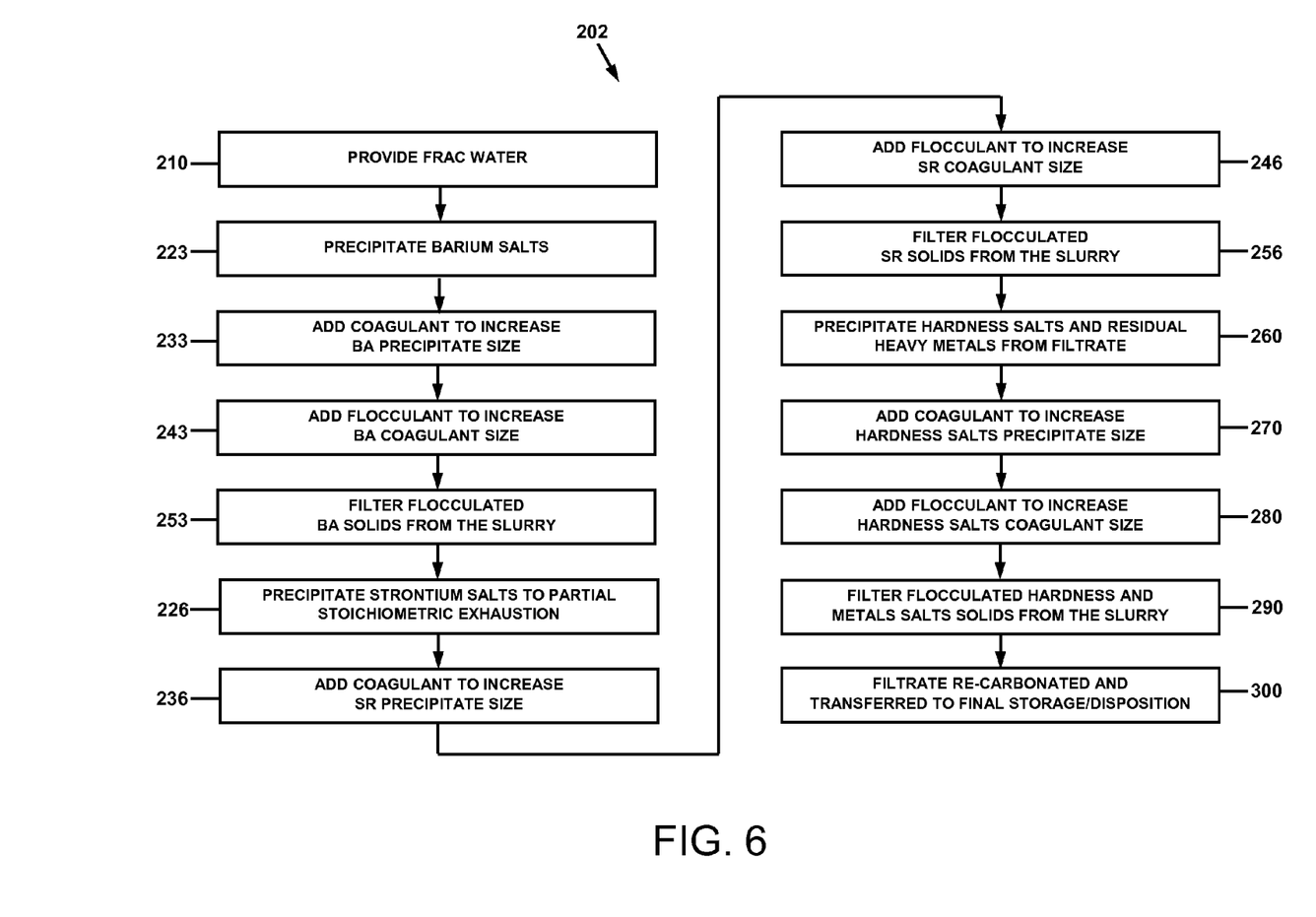
FIG. 6 is a flowchart of the process for treating frac water in circumstances where the concentration of residual sulfate ion ($SO_4^{-2}$) is sufficiently high so as to require sequential removal of barium followed by removal of strontium.

It has been determined that hydraulic transport of the flocculated precipitated salts that are formed in step 240 (and steps 243 and step 246 of the method 201 of FIG. 6 is optimized by maintaining the slurry in open channel, laminar flow. This is achieved through the proper selection of the flocculation tank outlet nozzles or outlet ports and pipe 22 diameter design to ensure that the flow criteria are met. The size and slope of the pipe 22 between the vessel 18 and the filter 24 may be selected so as to produce such open channel laminar flow.

Figure 9A:
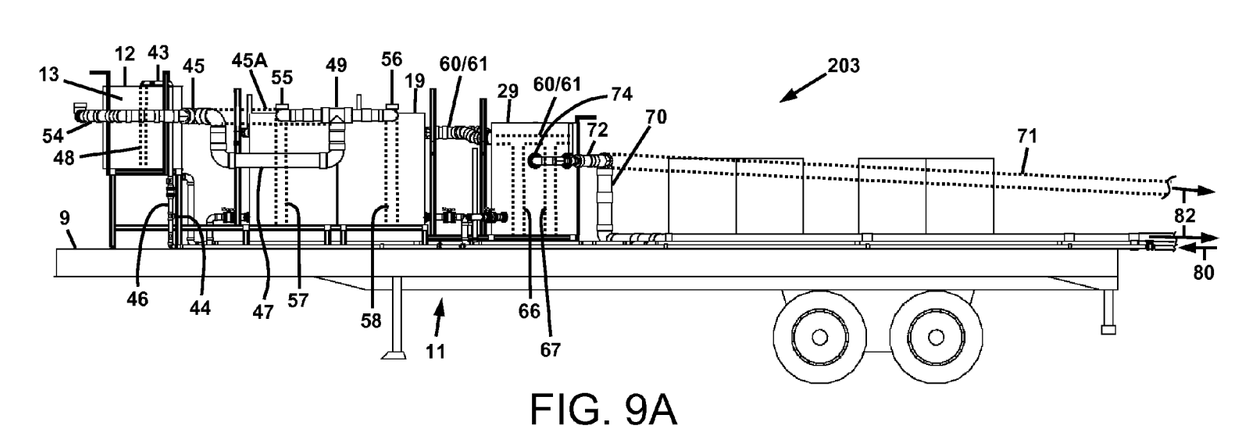
FIG. 9A is a side elevation schematic view of alternative configuration of a portable apparatus for treating frac water, in which gravity feed between process vessels is provided.
Figure 9B:
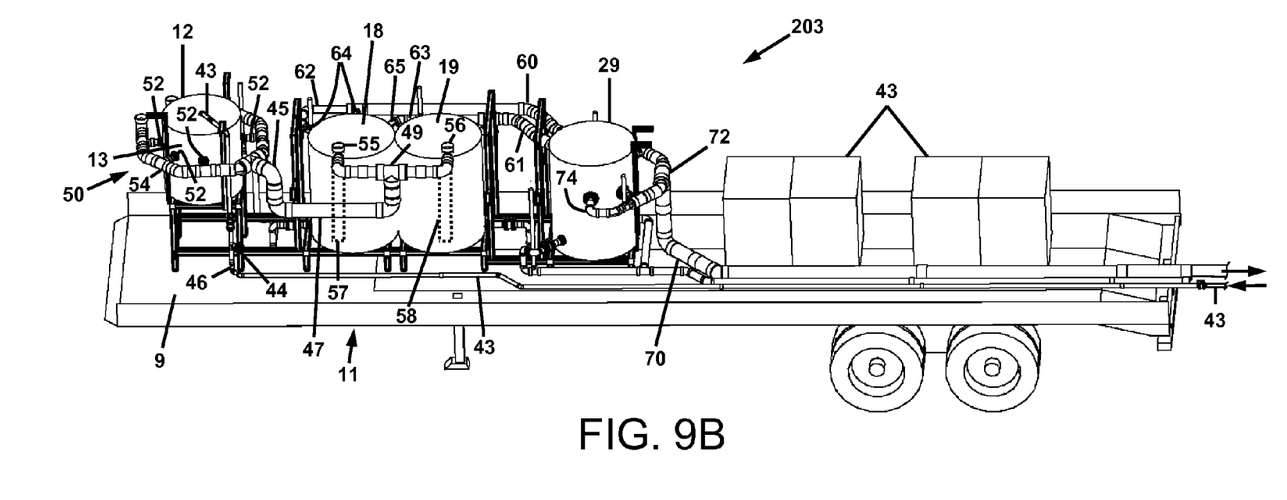
FIG. 9B is an upper perspective view of the apparatus of FIG. 9A.

This is best understood with reference to FIGS. 9A and 9B, which depict an alternative configuration of an apparatus 203 for treating frac water. The apparatus has a sufficiently small footprint so as to be fully portable of a vehicle 11, and has the capability to treat elevated levels of barium and strontium in its portable format at sufficiently high flow rates to meet the reported industry on-site needs. In addition, the modular format of the apparatus 203 provides for meeting elevated flow rate requirements with additional duplicate portable systems.

Referring to FIGS. 9A and 9B, the apparatus 203 is disposed upon the bed 9 of a vehicle 11, such as a truck bed or a trailer bed. The bed 9 may be enclosed by a box (not shown) for security and weatherproofing purposes. The apparatus 203 is comprised of a tank 12 for the initial inorganic sulfate precipitation, a tank 18 for addition of coagulant, and a tank 29 for addition of flocculant. The apparatus 203 may also include tanks 43 for storage of coagulant reagent and/or flocculant reagent, or for temporary storage of partially processed frac water.

In operation, the apparatus may operate in a batch mode, but more preferably, operates in a continuous flow mode. Frac water from the wellhead (not shown), storage vessel 100 (FIG. 1), or tank truck 8 (FIG. 1) is pumped to the apparatus 203 as indicated by arrow 80, and enters the precipitation vessel or tank 12 through conduit or pipe 43. Inorganic sulfate is added to tank 12, and precipitation of barium sulfate and/or strontium sulfate occurs. The inorganic sulfate, such as a sodium sulfate solution, may be added by injection directly into the pipe 43, such as at a port 44 provided in riser pipe 46. The supply pipe 43 may include a drop pipe 48 extending downwardly proximate to the bottom of the tank 12. The vessel 12 is provided with a mixer (not shown) that provides agitation of the liquid in the tank as the precipitation proceeds. The tank is provided with a volume that results in an average residence time of about two to three minutes therein at the desired range of flow rate through the apparatus, in order for the precipitation to be completed.

The second vessel or tank 18 (optionally including additional tanks, such as tank 19) is disposed upon a second stand at a lower level than tank 12. Tanks 18 and 19 are in liquid communication with the first tank 12 through a first conduit 45 configured to provide gravity feed of liquid from the first tank 12 to the second tanks 18 and 19. The first conduit 45 may include a U-shaped section 47. The U-section 47 is sized and positioned so as to ensure that flow is equally distributed through a tee 49 between tanks 18 and 19 without the need for in-line flow control devices, even if some variation in the overall flow rate through the apparatus 203 occurs. This is accomplished while also maintaining laminar flow of liquid from the first tank 12 to the second tanks 18/19 through the conduit 45.

Alternatively, the first conduit 45 may be a minimally sloped conduit 45A (shown in dotted line in FIG. 9A). The diameter and slope of the conduit 45A is chosen, along with the flow rate of frac water though the apparatus so as to result in open channel laminar flow of liquid from the first tank 12 to the second tanks 18/19. In such a configuration, some additional flow controls may be needed in the inlet supply pipes to distribute flow equally to tanks 18 and 19.

The first conduit 45 may be comprised of a manifold 50 of feed pipes connected to a side wall 13 of the first tank 12. In the embodiment depicted in FIGS. 9A and 9B, the side wall 13 of the first tank 12 is cylindrical in shape, and the manifold 50 is comprised of a plurality of feed pipes 52 directed radially outwardly from the wall 13 and connected to an approximately toroidal header 54. The header 54, feed pipes 52, and connections to the wall 13 are provided in sufficient number and diameter so as to ensure laminar flow of the liquid out of the tank 12. The connections may have a radiused transition from the tank into the respective feed pipes to prevent turbulent flow.

The pipes 55 and 56 into respective tanks 18 and 19 may be provided with drops 57 and 58 that extend proximate to the bottoms of tanks 18 and 19. Injection of the coagulant for formation of pin flocs in tanks 18 and 19 may be performed in these drops. Each of the tanks 18 and 19 are provided with a mixer (not shown), which may include a low speed wide blade turbine style agitator such as a Rushton Impeller, as described previously in this specification. The tanks 18 and 19 are provided at a volume that results in an average residence time of about three to ten minutes therein at the desired range of flow rate through the apparatus 203, in order for the pin floc formation to be completed.

The tanks 18 and 19 are in liquid communication with the tank 29 through respective conduits 60 and 61, which are configured to provide gravity feed of liquid from the tanks 18 and 19 to tank 29, while maintaining laminar flow therein. The conduits 60 and 61 may be minimally sloped so as to result in open channel laminar flow therein.

The conduit 60 may be comprised of a header 62 of feed pipes connected to a side wall 13 of the first tank 12. In the embodiment depicted in FIGS. 9A and 9B, the side wall of the first tank 18 is cylindrical in shape, and the header 62 is comprised of a plurality of feed pipes 64 directed radially outwardly from the wall and connected to the header 62. The header 62 and feed pipes 64, and connections to the wall of tank 18 are provided in sufficient number and diameter so as to ensure laminar flow of the liquid out of the tank 18. The connections may have a radiused transition from the tank into the respective feed pipes to prevent turbulent flow. The conduit 61 is provided with a similar header 63 and feed pipes 65.

The pipes or conduits 60 and 61 into tank 29 may be provided with drops 66 and 67 that extend proximate to the bottoms of tank 29. Injection of the flocculant for formation of large flocs in tank 29 may be performed in these drops, or within tank 29 proximate to their outlets. Tank 29 is provided with a mixer (not shown), which may include a low speed wide blade turbine style agitator such as a Rushton Impeller, as described previously in this specification. The tank 29 is provided at a volume that results in an average residence time of about five minutes therein at the desired range of flow rate through the apparatus 203, in order for the large floc formation to be completed.

The tank 29 is in liquid communication with a filter 24 (FIG. 1). In the apparatus of FIGS. 9A and 9B, the filter 24 is not provided on the vehicle 11. In this system, the filter 24 may be a large roll-off style refuse box type filter, such as the aforementioned DryBox filter.

The tanks 29 is in liquid communication with the filter 24 as indicated by arrow 82 through a conduit 70, which is configured to provide gravity feed of liquid from the tank 29 to the filter 24, while maintaining laminar flow therein. The conduit 70 may be comprised of a header 72 of feed pipes connected to a side wall of the tank 29. In the embodiment depicted in FIGS. 9A and 9B, the side wall of the tank 29 is cylindrical in shape, and the header 72 is comprised of a plurality of feed pipes 74 directed radially outwardly from the wall and connected to the header 72. The header 72 and feed pipes 74, and connections to the wall of tank 29 are provided in sufficient number and diameter so as to ensure laminar flow of the liquid out of the tank 29. The connections may have a radiused transition from the tank into the respective feed pipes to prevent turbulent flow.

It has also been determined that hydraulic transport of the flocculated precipitated salts from tank 29 within an open style dewatering device is optimized through mitigation of any cascading of the slurry once the final flocs are formed. This may be achieved through utilization of a flexible, appropriately sized decline conductor (hose) for the slurry into the dewatering equipment. This conductor is fitted with an appropriate flotation device (float) at the discharge point of the hose to maintain the point of discharge at the surface of the accumulating slurry within the dewatering equipment. Referring again to FIG. 9A, conduit 70 may thus alternatively be provided as a flexible sloped conduit 71, which is indicated in dotted line.

The barium and strontium, and other minor precipitated salts are captured on the filtration fabric in the DryBox or other filtration system 24. The solids are dewatered and are ready for landfill disposal or other disposition. The filtrate from the DryBox 24 may be discharged into a sump tank 25, and then subsequently transferred to one or more storage tanks 27.

The clear filtrate from the DryBox will likely contain magnesium and calcium (hardness) salts in addition to sodium chloride salt. If it is desirable to remove these hardness salts, steps 260 through 290 in the process 200 (FIG. 4) or steps 260 through 290 in the process 202 (FIG. 6) proceed with a subsequent sequential addition and timed reaction of chemicals for the precipitation of these inorganic contaminants and their subsequent coagulation and flocculation and filtration.

Conventional "cold lime softening" is utilized for the removal of the carbonate hardness from the DryBox filtrate water. Considerable available technical data on Marcellus Shale waste frac water indicates that the hardness salts are anticipated to be more chloride than carbonate in nature. In this instance, sodium carbonate (soda ash) in conjunction with the cold lime may be utilized. The sequence of addition of the lime and soda ash are a function of the relative concentrations of the carbonate and non-carbonate hardness salts. The chemistry for these processes is well defined in documentation and literature. However conventional technology is large and typically stationary in nature.

The Applicant has developed a process which utilizes batch and/or semi-continuous and/or continuous reaction apparatus for the reaction of the lime and/or soda ash with the hardness salts, and the subsequent coagulation and flocculation and filtration of the precipitated materials. In a preferred embodiment of the instant method, the DryBox filter 24 may be utilized as the filtration device as well as the sedimentation clarifier requisite for the proper operation of a lime and/or soda ash softening system.

The hardness salts are precipitated together through an ion exchange reaction with lime and/or soda ash. Referring again to FIGS. 1-4 and FIG. 6, in step 260, the lime and/or soda ash are introduced from respective storage vessels 26 and 28 via pumps 37 and 39 into the DryBox filtrate as a dissolved aqueous solution of a concentration below their respective saturation points. They may be blended and reacted with the DryBox filtrate in either a batch tank 30 or as a continuous feed into a moving flow of the waste frac water in a pipe or other conduit. In one embodiment, it has been determined that an optimum reaction time to complete the ion exchange reaction is approximately 30 to 90 minutes. Alternatively, these may be added as dry materials provided additional reaction time is allowed. Depending upon the degree of desired removal of the hardness salts by the well operator, the molar ratio of lime and/or soda ash to hardness salts has been found to be effective in the range of 0.5 moles of lime and/or soda ash to hardness salts for partial removal, up to in excess of 1.2 moles of lime and a stoichiometric amount of soda ash to hardness for complete removal.

Following the ion exchange reaction to precipitate the hardness salts, in step 270 a coagulant is introduced into the slurry of the precipitated hardness salts, and other precipitated materials. This coagulant forms a fine "pin floc" of the precipitated materials which will later be formed into a larger floc suitable for efficient filtration. In one embodiment, the optimum coagulant for this application has been determined to be a metal chloride, aluminum chlorhydrate. However, multiple alternate metal chlorides may also be utilized. In one embodiment, the addition ratio of the coagulant has been determined to be approximately 0.1 to 0.2 parts of the coagulant per part of the solution. The coagulant may be introduced to the precipitated slurry as a neat material, or as a more diluted aqueous solution from a vessel depending upon the site specific requirements and available feed equipment. It may be blended and reacted with the slurry in either a batch tank 32 or as a continuous feed into a moving flow of the precipitated slurry in a pipe or other conduit. In one embodiment, it has been determined that an optimum reaction time to complete the pin floc formation of the hardness salts is approximately three to five minutes.

Following the formation of the pin flocs by the introduction of coagulant, an anionic flocculant is added to the slurry in step 280. This flocculant forms the pin flocs into large flocs which are suitable for efficient filtration. The optimum flocculant for this application has been determined to be anionic polyacrylimide, such as F-303AH as provided by Water Specialists Technologies, LLC of Sanford, Fla. However, multiple alternate anionic polyacrylimides may also be utilized. In one embodiment, the addition ratio of the flocculant has been determined to be approximately 0.01 parts of the flocculant per part of the solution. The flocculant may be introduced to the pin floc slurry as a diluted aqueous solution from a vessel in the range of 0.1% to 0.5% concentration, depending upon the site specific requirements and available feed equipment. It may be blended and reacted with the pin floc slurry in either a batch or continuous flow-through tank 34 or as a continuous feed into a moving flow of the pin floc slurry in a pipe or other conduit. In one embodiment, it has been determined that an optimum reaction time to complete the large floc formation of the hardness salts is approximately three to ten minutes. It has been determined that the process performance is optimized by the utilization of a low speed wide blade turbine style agitator.

Figure 2:
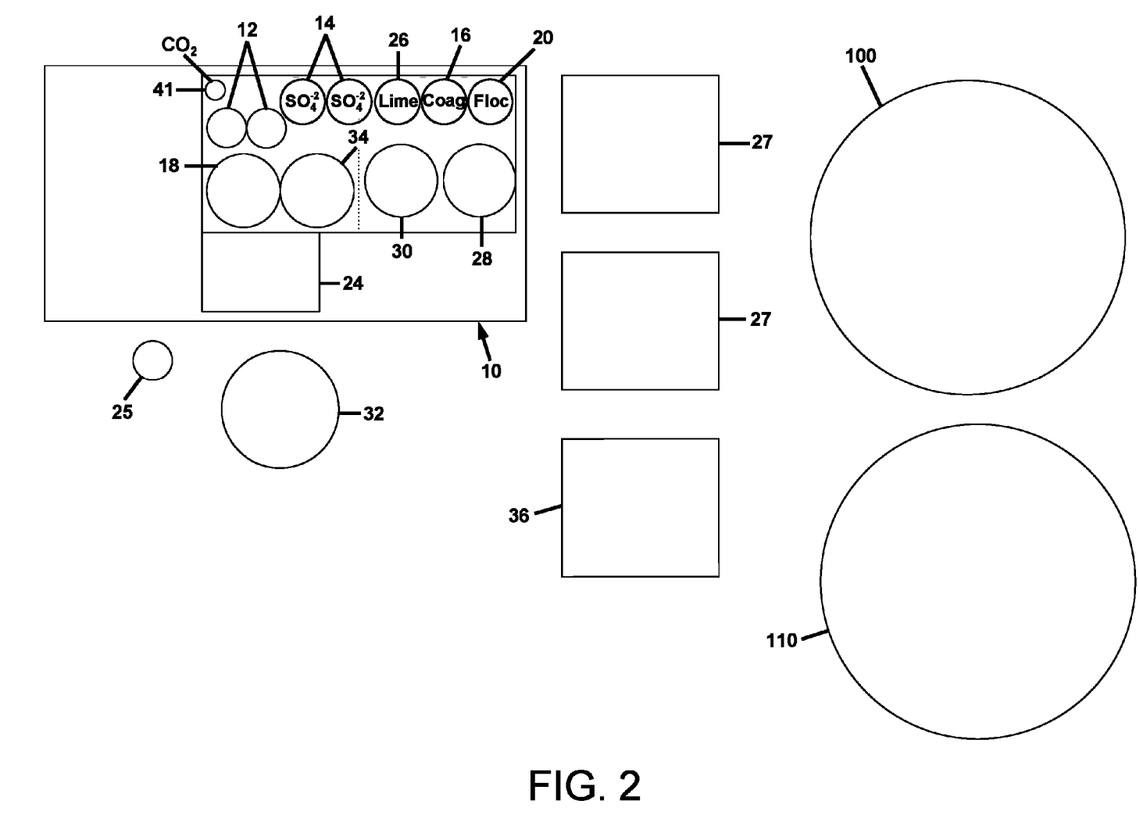
FIG. 2 is a plan view of a general arrangement for one embodiment of the apparatus.
Figure 3:
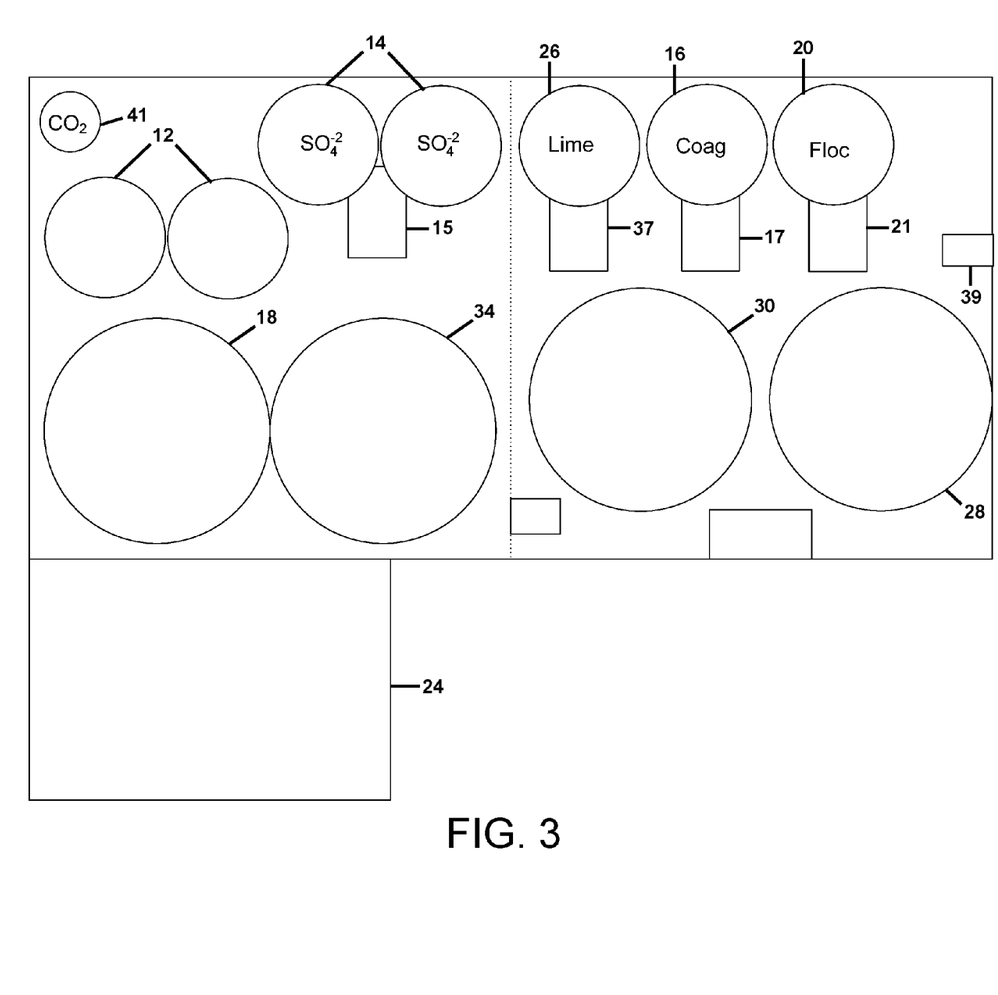
FIG. 3 is a detailed plan view of a portion of the apparatus that is disposed on a trailer or other vehicle to render the apparatus portable.
Figure 4:
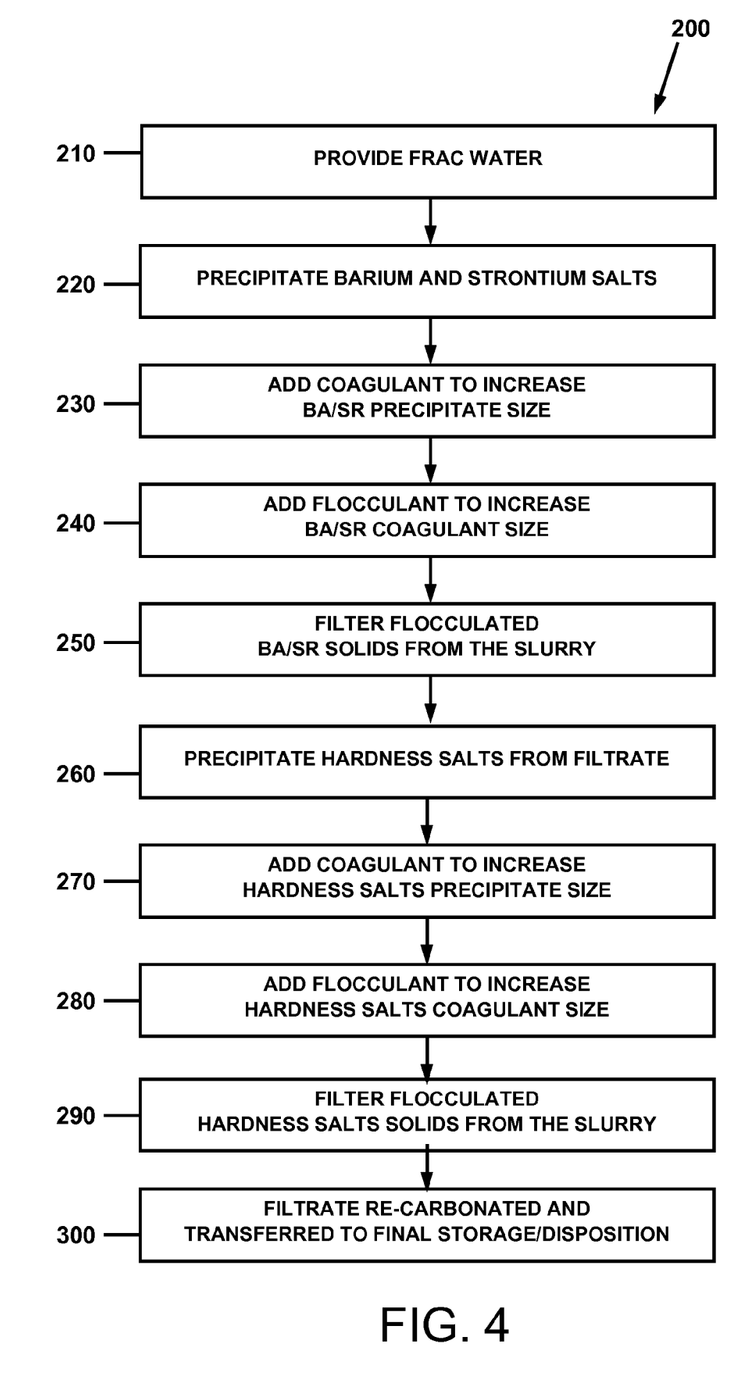
FIG. 4 is a flowchart of the process for treating frac water in circumstances where the concentration of residual sulfate ion ($SO_4^{-2}$) is not excessively high.

In step 290, the now flocculated slurry is introduced into a filtration device. The filtration device may be a DryBox as described previously herein. The filtration device may be a separate device, or the device 24 as shown in FIGS. 1-3. In the embodiment depicted in FIGS. 1-3, the DryBox 24 replaces the clarification sedimentation step typically required by conventional cold lime softening systems. Rather than wait for the sedimentation process and the requirement for desludging and subsequent filtration and dewatering of the sludge, the flocculated sludge is filtered from the slurry and captured on the fabric (not shown) of the DryBox 24 and dewatered.

Instead of filtration and dewatering, at locations where this practice may be permissible, the flocculated slurry may be discharged to the well drilling residual waste collection pit, or other such proximate collection pit or lagoon, where the flocculated slurry may settle and the clarified supernatant liquid may be withdrawn from the pit or lagoon for the same intended uses.

As alternatives to the DryBox filter and other active filters, various other static style gravity filtration systems available to the industry may be used as the filtration device 24. These include common filtration boxes as provided by Rain for Rent (25 Yard Filter Box) or Flotrend (models RB-25-O-G/V-VPF, RB-20-O-G/V, RB-20-C-B and/or RB-25-O-G/V-S) and other similar agents and various applications of the Geotube® as provided by Marifi Company. These systems perform substantially the same function as the DryBox. However, the "active filtration" process of the DryBox is believed to provide enhanced and accelerated dewatering of the filtered solids and is significantly less sensitive to problems associated with upsets in the coagulant and flocculent feed systems. In addition the Squeeze Tower Press (Squeeze Box™) and/or the Phaze Box™ manufactured and sold commercially by Idee e Prodotti S.r.l. of Cavenago Brianza, Italy, also "active filtration" devices, may be suitable.

The filtrate from the DryBox 24 or other filtration device 24 may be discharged into a sump tank 25, and then subsequently transferred to a tank 36 for re-carbonation in step 300. Recarbonation is the neutralization of the elevated pH of the solution in order to mitigate potential for subsequent precipitation of trace amounts of hardness salts after filtration. Carbon dioxide gas, such as from a tank, or hydrochloric acid may be utilized for this step. The clear filtrate from the process will contain dissolved sodium chloride and a minor level of residual calcium bicarbonate, as well as some sulfate salts of calcium or sodium. The filtrate may then be transferred to a final holding vessel 110 before being further processed to recover the sodium chloride as a saleable product, or blended with fresh water or reused as frac water in a subsequent fracing operation.

The liquid process apparatus for the barium and strontium salts removal and the hardness salts removal may be completely contained within a portable vehicle 10, as shown in FIGS. 2 and 3. (For the sake of simplicity of illustration, only the general arrangement of vessels and the filter 24 is shown in FIG. 2, with various pumps also being shown in FIG. 3. It is to be understood that various piping, pumps, and other components are present as shown in the schematic illustration of FIG. 1.) This vehicle 10 may be a box truck, a trailer truck or other similar mobile device. The influent waste frac water may flow into the vehicle 10 through an inlet port (not shown), which connects to the barium and strontium process equipment. The flocculated barium and strontium salts may exit the vehicle 10 via an outlet port (not shown), and pass into a filtration device(s) 24, such as one or more DryBoxes to retain the barium/strontium salts. The filtrate from this DryBox may be pumped for disposition if no further treatment is required, or it may re-enter the vehicle 10 through a different inlet port (not shown), or a separate vehicle containing the hardness system which will connect to the hardness removal process equipment. The flocculated hardness salt slurry may exit the vehicle 10 via a different outlet port (not shown) and pass into one or more separate hardness salts filters, such as DryBoxes, or into the filtration device 24. The clarified filtrate may then be pumped for disposition.

The vehicle 10 may be fitted with suitable insulation and portable, safety rated heating equipment to maintain the contents therein above freezing temperatures during inclement weather. The process may be instrumented to the extent needed for process monitoring and control. The process instrumentation capabilities may be configured for full automation of the process.

Figure 5:
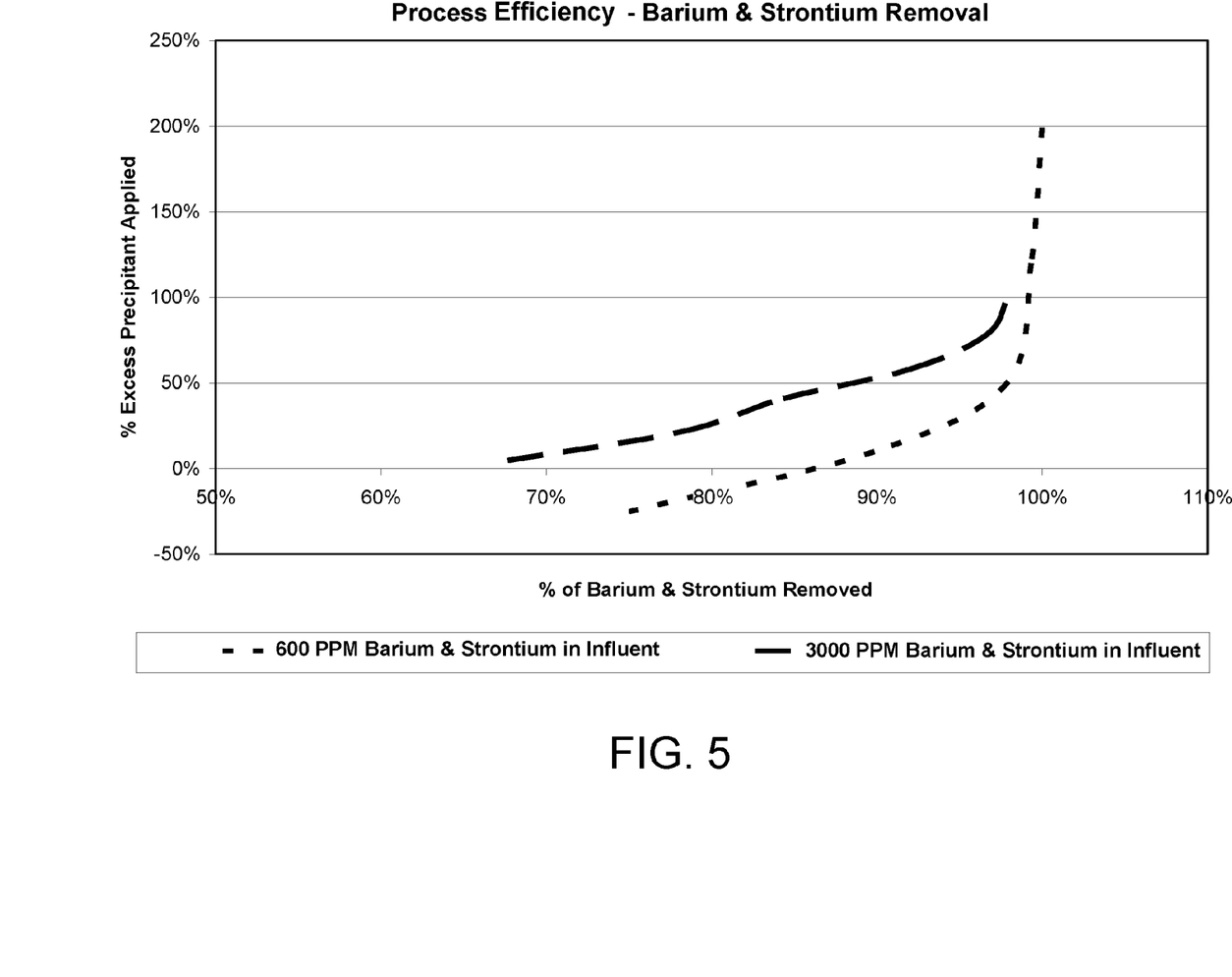
FIG. 5 is a graph of the dependence of the applied ratio of the stoichiometric amount of inorganic sulfate salt, typically sodium or magnesium sulfate salt, to the barium and strontium salts in two exemplary compositions of frac water being treated by the apparatus, in circumstances where the concentration of residual sulfate ion ($SO_4^{-2}$) is not excessively high.

Correlations have been demonstrated with this process between the applied ratio of the stoichiometric amount of inorganic sulfate salt to the barium and strontium salts in a composition of frac water undergoing treatment by the apparatus and process of the present invention. A sampling of the family of curves for two of these conditions is provided as FIG. 5. These correlations may be used by an operator of the apparatus and process to determine the optimum process conditions for treatment of a particular source of frac water.

In certain shale formations and with various hydro-fracturing methodologies, the concentrations of the barium and strontium chloride in the flowback water emerging from the wellhead may be sufficiently high such that the excess sulfate required to deplete those contaminants to acceptable levels for the end reuser may result in sulfate salt (calcium sulfate and/or sodium sulfate) levels in the treated water that are sufficiently high so as to render such treated water unusable for reuse. Conventional treatment process systems remove portions of this excess sulfate through an additional precipitation step utilizing a variety of inorganic salts such as ferric chloride.

It is undesirable to use such conventional treatment process systems because such use adds complexity and cost to the overall frac water remediation process. Instead, the Applicant has determined a particular sequential precipitation process which inhibits the production of the calcium or sodium sulfate salts, thereby mitigating the requirement for their removal, and mitigating the associated requirement to add a conventional treatment process and equipment to the frac water remediation process and apparatus.

Figure 8:
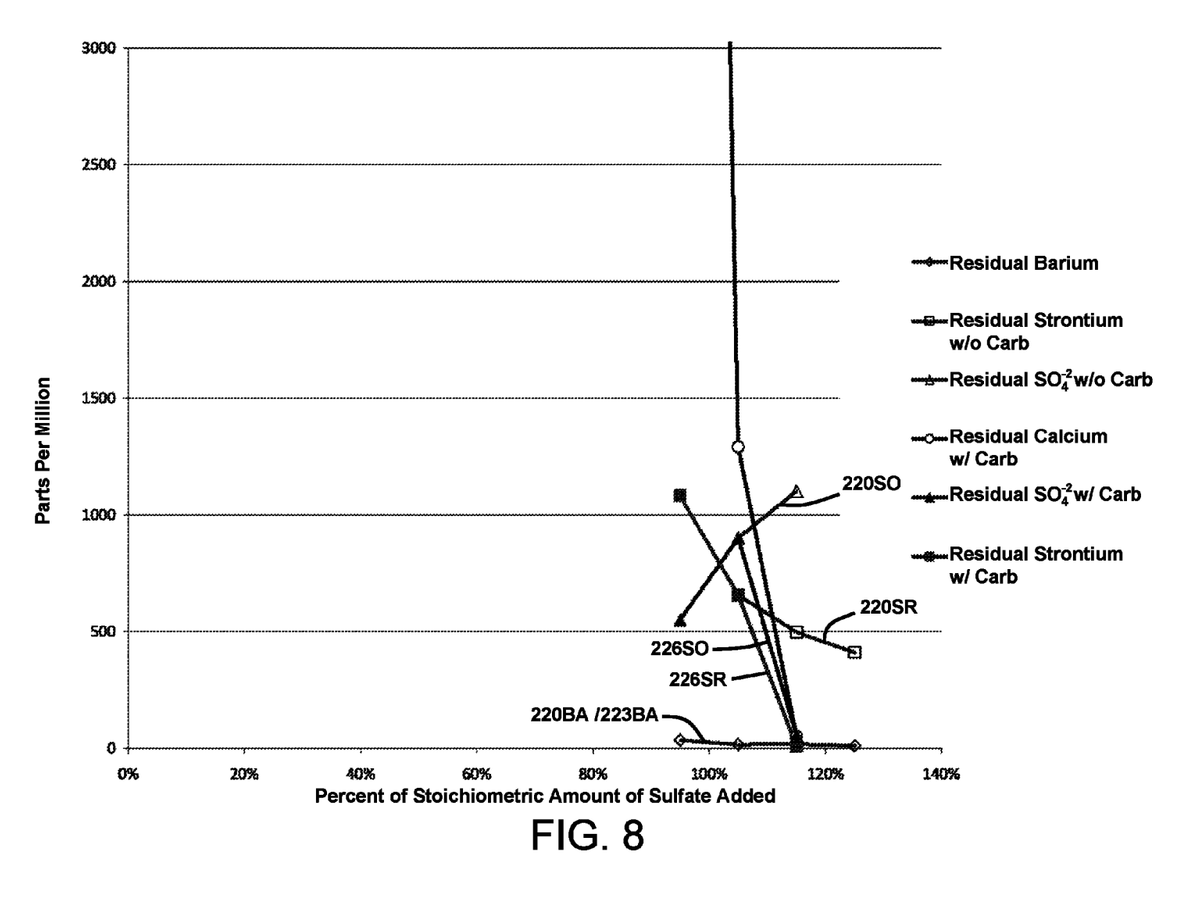
FIG. 8 is a graph of data from an exemplary treatment process in which a sequential precipitation of barium and strontium sulfate was performed.

The sequential precipitation process is illustrated schematically in FIG. 6, with exemplary results shown in a graph provided in FIG. 8. In one embodiment of this process, when a sufficiently elevated concentration of barium and strontium chloride contamination is present in the frac flowback water to be treated, in step 223, the stoichiometric quantity of sulfate salt to barium chloride is added to a volume of the flowback water, plus an excess of approximately 7% to 10% at a pH of approximately 3.6 to 3.8. This step 223 results in the precipitation of in excess of 99% of the barium chloride contamination to barium sulfate plus the precipitation of approximately 7% to 10% of the strontium chloride to strontium sulfate. This step 223 is accomplished with essentially no residual sulfate salt production above a test detectable limit of 50 PPM. This step 223 will produce barium sulfate at concentrations in excess of 90% pure, or higher, dependent upon the concentration of the strontium chloride in the flowback water. The barium sulfate solid may be removed at this stage. The barium sulfate removal may be performed by addition of coagulant to form pin flocs in steps 233, addition of flocculant to increase the particle size in step 243, and filtration in step 253. Steps 233, 243, and 253 may be practiced as described previously herein for steps 230, 240, and 250 of the method 200 of FIG. 4.

In a subsequent precipitation step 226, a sub-stoichiometric quantity (in this embodiment, about 93%) of sulfate salt to strontium chloride maybe added to the remaining flowback water produce strontium sulfate precipitate. (Only about 93% sub-stoichiometric sulfate salt is needed because about 7%-10% of the strontium sulfate was previously precipitated in step 223.) The strontium sulfate precipitated in step 226 may have a purity in excess of 99%, with a small residual contamination of barium and calcium sulfate salts. The amount of the strontium sulfate which may be precipitated without production of excess residual sulfate salts or excess co-precipitants is directly proportional to the concentration of the strontium chloride in solution and is controlled by the volume of sulfate salt added. Once the optimum level of strontium sulfate production has been achieved, the solid from this reaction may be removed by filtration in step 256. To facilitate filtration, the particle size of the strontium sulfate may be increased by the addition of coagulant in step 236, and the addition of flocculant in step 246, as described previously herein for method 200 of FIG. 4.

In a subsequent precipitation stage, the flowback water that has had most of the barium and strontium removed is then treated in a cold lime softening step 260 as discussed previously herein for method 200 of FIG. 4. In one experimental trail that is exemplary but not limiting with respect to the method 202, the concentration of the calcium hydroxide was determined to be at an optimum at 120% of the stoichiometric level to the magnesium chloride, and the concentration of the sodium carbonate was determined to be at an optimum at 100% to 105% to the calcium chloride. The resultant precipitate contained primarily magnesium hydroxide, calcium carbonate, strontium hydroxide and strontium carbonate. All of these are highly insoluble, inert, non hazardous compounds. Furthermore, there was substantially an absence of, or an acceptably low level of sulfate in the final treated effluent, thereby rendering it suitable for reuse as frac water make up.

Figure 7:
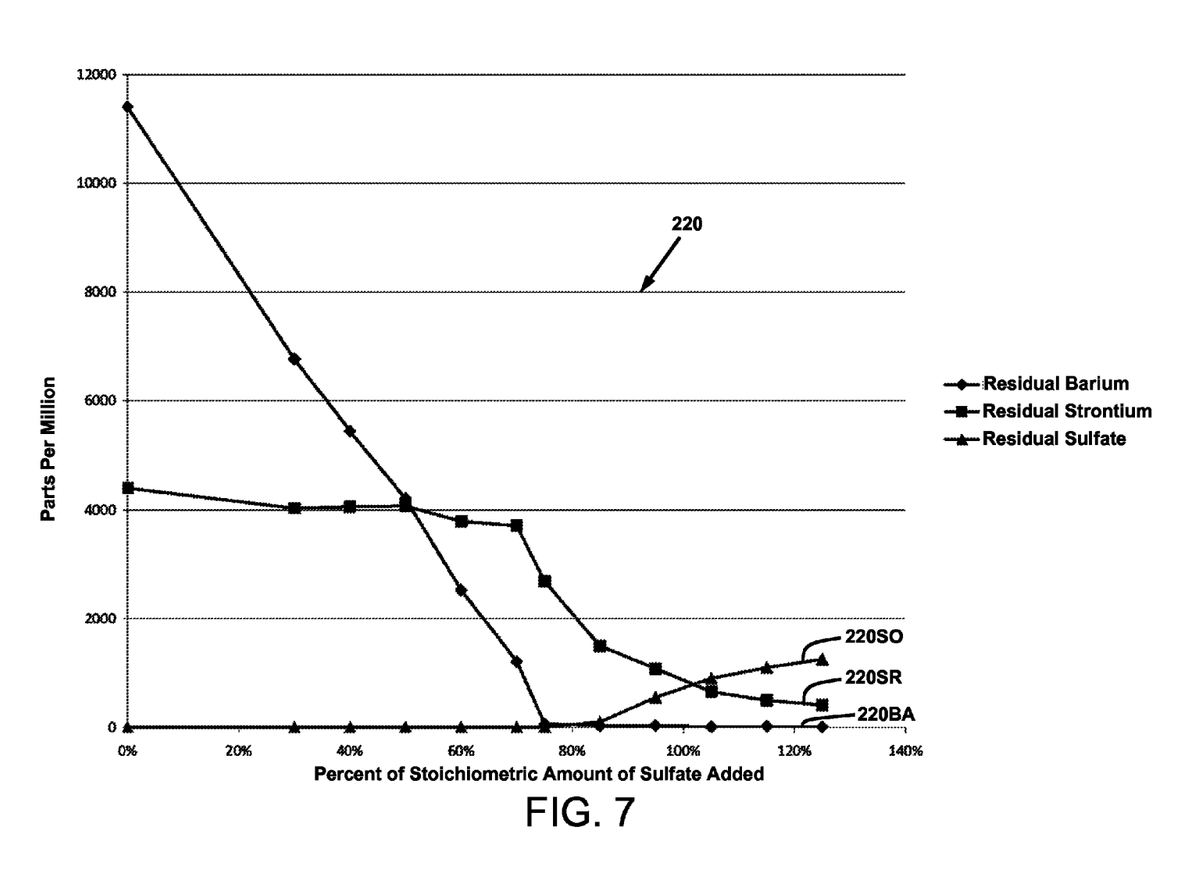
FIG. 7 is a graph of data from an exemplary treatment process in which a non-sequential precipitation of barium and strontium sulfate was performed.

The foregoing description of the sequential precipitation 223 of barium sulfate followed by precipitation 226 of strontium sulfate in the method 202 may be better understood with consideration of the exemplary experimental data provided in FIGS. 7 and 8.

FIG. 7 is a graph of data from an exemplary treatment process in which a non-sequential precipitation of barium and strontium sulfate was performed on a volume of frac flowback water. In this instance, the concentrations of the barium and strontium chloride in the flowback water emerging from the wellhead were sufficiently high such that the excess sulfate required to deplete those contaminants to acceptable levels resulted in sulfate salt (calcium sulfate and/or sodium sulfate) levels in the treated water that were high enough to render such treated water unusable for reuse. The non-sequential precipitation of the barium and strontium sulfate was performed as step 220 of the method 200 of FIG. 4. It can be seen that early in step 220, the barium sulfate precipitates preferentially, being reduced to substantially a zero concentration at around 75% stoichiometric sulfate added. At around 70% stoichiometric sulfate added, the rate of precipitation of strontium sulfate increases greatly as the presence of barium becomes exhausted. At around 85% stoichiometric sulfate added, the rate of precipitation of strontium sulfate decreases, while the presence of sulfate ion in solution begins to increase from a substantially zero level. At the conclusion of the step 220, although the concentration of strontium in the flowback water has decreased to about 400 ppm, the concentration of the sulfate has risen to about 1100 ppm. This high a concentration of sulfate may render the treated flowback water unsuitable for further use as frac water, or discharge into the environment. Further treatment is required, which is less desirable than the Applicant's process from a cost and throughput standpoint.

In contrast, FIG. 8 is a graph that contains data from an exemplary treatment process in which a sequential precipitation of barium and strontium sulfate was performed as shown in the method 202 of FIG. 6. FIG. 8 is a composite of data from the respective precipitation steps 223 and 226, and also includes data from the contrasting precipitation step 220 of the method 200. Only data near the endpoints of the respective precipitations is shown, i.e., between about 90% and about 130% of stoichiometric sulfate added. (It is also noted that "Carbonate" is abbreviated as "Garb" in FIG. 8.)

Data set 220BA/223BA depicts the residual barium concentration in both the flowback water treated in step 220 of method 200, and in step 223 of method 202. These concentrations are substantially the same for both methods, i.e., the removal of barium in both is effective. Data set 220SR depicts the residual strontium concentration in the flowback water treated in step 220 of method 200, which reaches a final concentration of about 400 ppm as also shown in FIG. 7. Data set 220SO depicts the residual sulfate concentration in the flowback water treated in step 220 of method 200, which rises to a final concentration of about 1100 ppm as also shown in FIG. 7.

In strong contrast, data set 226SR depicts the residual strontium concentration in the flowback water treated in step 226 of method 202, which in the actual data, reached a final concentration of about 8 ppm; and data set 226SO depicts the residual sulfate concentration in the flowback water treated in step 226 of method 202, which in the actual data, reached a final concentration of about 55 ppm. It can be seen that the Applicant's method 202 comprising sequential barium precipitation step 223 and strontium precipitation step 226 is significantly more effective in reducing the concentrations of barium and strontium, while maintaining a low concentration of sulfate in the final treated flowback water. The flowback water treated in accordance with the method 202 is suitable for reuse as frac water and for pretreatment for supplemental treatment methods such as evaporation for purification of the water and or recovery of sodium chloride salt.

It has been demonstrated that the depletion of the barium concentration below 100 PPM through sulfate precipitation as discussed above and at an acidic pH is important. If this concentration is not achieved, an elevated level of an undesirable byproduct, barium carbonate, is produced in the treated flowback water. This material is hazardous to humans and animals and would limit the suitability of the resultant waste solid from the process from going into a conventional landfill, as well as limit its suitability for potential reuse. It has been further demonstrated that by the Applicant's method, the barium concentration is consistently below this 100 PPM level, thereby avoiding the production of an unacceptable level of the undesirable barium carbonate which would render it unsuitable for disposal in a conventional landfill.

It has furthermore been demonstrated that by conducting the sulfate precipitations of barium and strontium and the mildly acidic pH, the production of calcium sulfate is mitigated as a side reaction, thereby producing essentially all barium sulfate and strontium sulfate while the pH is suppressed.

It has also been determined that there is a reduction in the performance of the coagulant/polymer reaction system resulting from the presence of elevated levels of organic contaminants. It has further been determined that elimination of these organic contaminants through treatment of the flowback water with ozone significantly mitigates the reduction of the subject performance.

It is, therefore, apparent that there has been provided, in accordance with the present invention, a method and apparatus for removal of contaminants from fracture water that is used in well drilling. Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention.

I claim:

1. A method of treating contaminated water effluent from a well comprising:
   a) adding inorganic sulfate to a volume of the contaminated water to cause precipitation of a first precipitate comprised of all but about 100 parts per million of barium present in the contaminated water as barium sulfate precipitate, and up to about 10 percent of strontium present in the contaminated water as strontium sulfate precipitate;
   b) separating the first precipitate from the volume of the contaminated water within a filtration system into first precipitate solids and a first filtrate;
   c) adding inorganic sulfate to the first filtrate to cause precipitation of a second precipitate comprised of all but about 1000 parts per million of the remaining strontium present in the contaminated water as strontium sulfate precipitate; and d) separating the second precipitate from the first filtrate within the filtration system into second precipitate solids and a second filtrate.

2. The method of claim 1, further comprising producing the second filtrate at a concentration of dissolved inorganic sulfate of less than about 1000 parts per million.

3. The method of claim 1, further comprising adding a reagent to the second filtrate to cause the precipitation of hardness salts, and separating the hardness salts within the filtration system into hardness salts solids and a third filtrate.

4. The method of claim 1, further comprising delivering the volume of the contaminated water with first precipitate to the filtration system in open channel laminar flow through a first conduit.

5. The method of claim 4, wherein the open channel laminar flow through the first conduit is laminar flow through a U-shaped section formed in the first conduit.

6. The method of claim 1, further comprising flocculating the first precipitate prior to separating the first precipitate from the volume of the contaminated water within the filtration system, by causing the volume of the contaminated water with the barium sulfate precipitate and strontium sulfate precipitate to flow in open channel laminar flow through a first conduit while adding a first reagent to the volume of contaminated water to cause the formation of barium sulfate and strontium sulfate flocs of a first size, and causing the volume of the contaminated water with the barium sulfate and strontium sulfate flocs of the first size to flow in open channel laminar flow through a second conduit while adding a second reagent to the volume of contaminated water and causing the formation of barium sulfate and strontium sulfate flocs of a second size.

7. The method of claim 6, further comprising flocculating the second precipitate prior to separating the second precipitate from the first filtrate within the filtration system, by causing the first filtrate with the second precipitate to flow in open channel laminar flow while adding the first reagent to the first filtrate with the second precipitate to cause the formation of barium sulfate and strontium sulfate flocs of the first size, and causing the first filtrate with the second precipitate with the barium sulfate and strontium sulfate flocs of the first size to flow in open channel laminar flow while adding the second reagent to the first filtrate with the second precipitate and causing the formation of barium sulfate and strontium sulfate flocs of the second size.

8. A method of treating contaminated water effluent from a well, the method comprising:

a) adding inorganic sulfate to a volume of the contaminated water to cause precipitation of a first precipitate comprised of all except up to about 100 parts per million of barium present in the volume of the contaminated water as barium sulfate precipitate, and up to about 10 percent of strontium present in the volume of the contaminated water as strontium sulfate precipitate;

b) causing the barium sulfate and strontium sulfate precipitate to form separable barium sulfate and strontium sulfate flocs;

c) separating the separable barium sulfate and strontium sulfate flocs within a filtration system into solid barium sulfate and strontium sulfate and a first filtrate comprised of up to about 100 parts per million of barium present in the volume of the contaminated water and at least about 90 percent of the strontium present in the volume of the contaminated water;

d) adding inorganic sulfate to the first filtrate to cause precipitation of a second precipitate comprised of all except up to about 1000 parts per million of the at least about 90 percent strontium present in the first filtrate as strontium sulfate precipitate; and e) separating the second precipitate from the first filtrate within the filtration system into solid strontium sulfate and a second filtrate containing less than about 10 parts per million of barium, 1000 parts per million of strontium, and 1000 parts per million of dissolved sulfate.

9. The method of claim 8, further comprising producing solid barium sulfate following separation from the first filtrate at a purity of at least 90%.

10. The method of claim 8, further comprising producing solid strontium sulfate following separation from the second filtrate at a purity of at least 99%.

11. The method of claim 8, further comprising adding a carbonate reagent to the second filtrate to cause the precipitation of hardness salts, and separating the hardness salts within the filtration system into hardness salts solids and a third filtrate.

12. The method of claim 8, further comprising adding a carbonate reagent to the second filtrate to cause the precipitation of a third precipitate comprising hardness salts, and separating the third precipitate from the second filtrate within the filtration system into solid hardness salts including strontium sulfate and a third filtrate containing less than about 10 parts per million of barium, 10 parts per million of strontium, and 55 parts per million of dissolved sulfate.

13. The method of claim 8, further comprising delivering the volume of the contaminated water containing separable barium sulfate and strontium sulfate flocs to the filtration system in open channel laminar flow through a first conduit.

14. The method of claim 13, wherein the open channel laminar flow through the first conduit is laminar flow through a U-shaped section formed in the first conduit.

15. The method of claim 8, further comprising flocculating the second precipitate prior to separating the second precipitate from the first filtrate within the filtration system, by causing the first filtrate with the second precipitate to flow in open channel laminar flow through a first conduit while adding a first reagent to the first filtrate with the second precipitate to cause the formation of separable barium sulfate and strontium sulfate flocs.

16. The method of claim 15, wherein the open channel laminar flow through the first conduit is laminar flow through a U-shaped section formed in the first conduit.

17. The method of claim 3, further comprising neutralizing the pH of the second filtrate.

* * * * *